(12) United States Patent
Lee et al.

(10) Patent No.: US 6,224,650 B1
(45) Date of Patent: May 1, 2001

(54) APPARATUS FOR MANUFACTURING MOLTEN IRON BY USING CALCINATION FURNACE, AND MANUFACTURING METHOD THEREFOR

(75) Inventors: Sang Deok Lee; Young Chae Jung; Yoon Chul Park, all of Pohang (KR)

(73) Assignee: Pohang Iron & Steel Co., Ltd. (KR)

( * ) Notice: Subject to any disclaimer, the term of this patent is extended or adjusted under 35 U.S.C. 154(b) by 0 days.

(21) Appl. No.: 09/214,320

(22) PCT Filed: May 2, 1997

(86) PCT No.: PCT/KR97/00076

§ 371 Date: Jan. 4, 1999

§ 102(e) Date: Jan. 4, 1999

(87) PCT Pub. No.: WO98/50591

PCT Pub. Date: Nov. 12, 1998

(51) Int. Cl.[7] ............................. C21B 11/00; C21B 13/14
(52) U.S. Cl. ................. 75/448; 75/453; 75/487; 266/156; 266/157; 266/172
(58) Field of Search .................. 75/448, 453, 487; 266/156, 157, 172

(56) References Cited

U.S. PATENT DOCUMENTS

| | | | |
|---|---|---|---|
| 3,936,296 | * | 2/1976 | Campbell . |
| 4,181,502 | * | 1/1980 | Weber et al. .................. 44/599 |
| 4,195,821 | * | 4/1980 | Beggs et al. .................. 266/156 |
| 4,448,402 | * | 5/1984 | Weber et al. .................. 266/183 |
| 4,588,439 | * | 5/1986 | Kepplinger et al. ............ 75/445 |
| 4,849,015 | * | 7/1989 | Fassbinder .................... 75/501 |
| 4,978,387 | | 12/1990 | Kepplinger .................... 75/445 |
| 5,630,862 | * | 5/1997 | Greenwalt ..................... 75/445 |

FOREIGN PATENT DOCUMENTS

| | | | |
|---|---|---|---|
| 1167368 | * | 4/1964 | (DE) . |
| WO 94 08055 | | 4/1994 | (WO) . |
| 9801585 | * | 1/1998 | (WO) . |

* cited by examiner

*Primary Examiner*—Roy King
*Assistant Examiner*—Tima McGuthry-Banks
(74) *Attorney, Agent, or Firm*—Webb Ziesenheim Logsdon Orkin & hanson, P.C.

(57) ABSTRACT

An apparatus for manufacturing molten iron by using a calcination furnace, and a manufacturing method therefor are disclosed. A high temperature reducing gas (1000 to 1100° C.) from a melter gasifier is used as a calcination heat in a calcination furnace so as to cool the high temperature reducing gas to the optimum reduction temperature (800 to 850° C.), and so as to supply the cooled reducing gas to a shaft furnace, whereby the manufacture of the molten iron can be efficiently carried out, and a high thermal efficiency is realized even without a separate gas cooling device. Therefore, a separate cooling device for cooling the hot reducing gas of the melter gasifier is not required. Further, the hot reducing gas is naturally cooled at the calcination furnace, and therefore, the thermal efficiency of the hot reducing gas of the melter gasifier is maximized. Further, a separate water-using cooler and a separate compressor are omitted, and therefore, the molten iron manufacturing facility is simplified.

12 Claims, 6 Drawing Sheets

APPARATUS FOR MANUFACTURING MOLTEN IRON BY USING CALCINATION FURNACE, AND MANUFACTURING METHOD THEREFOR

BACKGROUND OF THE INVENTION

1. Field of the Invention

The present invention relates to an apparatus for manufacturing molten iron by using a calcination furnace, and a manufacturing method therefor. More specifically, the present invention relates to an apparatus for manufacturing molten iron by using a calcination furnace, and a manufacturing method therefor, in which a high temperature reducing gas (1000 to 1100° C.) from a melter gasifier is used as a calcination heat in a calcination furnace so as to cool the high temperature reducing gas to the optimum reduction temperature (800 to 850° C.), and so as to supply the cooled reducing gas to a shaft furnace, whereby the manufacture of the molten iron can be efficiently carried out, and a high thermal efficiency is realized even without a separate gas cooling device.

2. Description of the Prior Art

Generally, the molten iron manufacturing apparatus which utilizes the smelting reduction such as COREX, DIOS, HISMELT or the like which is under study for replacing the blast furnace is equipped with a melter gasifier and a shaft furnace. Thus by utilizing the high temperature reducing gas from the melter gasifier, the iron ore which is filled in the shaft furnace is made to undergo a reduction. Then the reduced iron ore which has undergone the reduction is transferred to a melter gasifier to make it undergo a final reduction.

As shown in FIG. 1, U.S. Pat. No. 4,978,387 discloses a molten iron manufacturing apparatus which uses the ordinary coal. In this conventional molten iron manufacturing apparatus, an iron ore 1a and additives (lime stone and dolomite) 1b are put into a shaft furnace 2, and then the iron ore 1a is made to undergo a reduction by 90 to 95%. Then a melter gasifier 5 is filled with an ordinary coal 3, the reduced iron ore and a calcined additive. Then the ordinary coal is burned within the melter gasifier so as to produce heat and a reducing gas. By utilizing the heat and the reducing gas, the iron ore which has been reduced in the shaft furnace 2 is smelted and finally reduced for the second time. Under this condition, the gas which is produced in the melter gasifier 5 has a temperature of 1000 to 1100° C.

Meanwhile, the reducing gas which is produced in the above described manner is transferred through a generator gas line 6 (which is connected to the melter gasifier 5) to a cyclone 7. The cyclone 7 captures the dusts within the reducing gas, and the high temperature reducing gas is supplied through a reducing gas line 9 to the shaft furnace 2. Meanwhile, the dusts which have been captured by the cyclone 7 are made to return through a dust burner 8 to the melter gasifier 5.

The reducing gas which is supplied to the shaft furnace 2 has to be maintained at a temperature of 800–850° C., and therefore, the hot reducing gas which has been discharged from the cyclone 7 and which has a temperature of 1000–1100° C. has to be necessarily cooled. In order to be cooled, a part of the hot reducing gas which has removed the dusts is transferred through a cooling gas line 10 (which is connected to the reducing gas line 9) to a venturi scrubber 11 so as to be cooled.

The reducing gas which has been cooled by the venturi scrubber 11 is supplied by a compressor 12 to a mixed gas line 13 which is connected to the generator gas line 6 of the melter gasifier 5. Thus the cooled reducing gas is mixed with the hot reducing gas which has been produced in the melter gasifier 5, with the result that the hot reducing gas of 1000–1100° C. is adjusted to the optimum reducing temperature of 800–850° C. The reducing gas which has been temperature-adjusted is finally exactly adjusted to 800–850° C. in the reducing gas line 9 so as to be supplied to the shaft furnace 2. Further, this reducing gas furnishes heat for the reduction of the iron ore 1a and the calcination of the additives (lime stone and dolomite) 1b.

However, in the above described conventional molten iron manufacturing apparatus which uses the ordinary coal, the reducing gas which is produced in the melter gasifier has a temperature of above 1000° C. Therefore, its temperature is adjusted to an optimum reducing temperature of 800–850° C., and then, the reducing gas is supplied to the shaft furnace. For this purpose, a separate cooling device such as the venturi scrubber 11 is necessarily required. Further, if the cooled reducing gas is to be supplied to the mixed gas line 13 which is connected to the melter gasifier 5, a separate pressing and sending device such as the compressor 12 is required, and the compressor is frequently disordered, thereby causing problems.

SUMMARY OF THE INVENTION

The present invention is intended to overcome the above described disadvantages of the conventional techniques.

Therefore it is an object of the present invention to provide an apparatus for manufacturing molten iron by using a calcination furnace and a manufacturing method therefor, in which additives are heated and calcined by using a hot reducing gas, and thus, the hot additives are supplied to a shaft furnace and a melter gasifier, so that the heat loss due to the temperature-raising and calcination of the additives can be decreased.

It is another object of the present invention to provide an apparatus for manufacturing molten iron by using a calcination furnace and a manufacturing method therefor, in which a separate cooling device is excluded so as to simplify the facility, and the hot reducing gas is cooled to the optimum reducing temperature without using the cooling device so as to maximize the thermal efficiency.

In achieving the above objects, the apparatus for manufacturing molten iron including a shaft furnace for receiving an iron ore and additives, and a melter gasifier for receiving a reduced iron ore, calcined additives and an ordinary coal according to the present invention includes:

a calcination furnace for receiving a hot reducing gas through a reducing gas line from a cyclone (which is connected through a generator gas line to the melter gasifier), for receiving the additives, and for calcining the additives by means of the hot reducing gas to cool the hot reducing gas to an optimum reducing temperature suitable for the shaft furnace so as to send the reducing gas through a reducing gas line to the shaft furnace; and a plurality of additive feeding lines connected between the calcination furnace, the shaft furnace and the melter gasifier, for supplying the calcined additives to the shaft furnace and to the melter gasifier, after the additive has been calcined by the hot reducing gas in the calcination furnace.

In another aspect of the present invention, the method for manufacturing a molten iron by using a shaft furnace for receiving an iron ore and additives, and a melter gasifier for receiving a reduced iron ore, calcined additives and ordinary coal, so as to reduce the iron ore to a molten iron according to the present invention includes the steps of:

burning the ordinary coal within the melter gasifier, and smelt-reducing a reduced iron ore, so as to produce a hot reducing gas;

separating and capturing dusts contained within the hot reducing gas;

sending the hot reducing gas to a calcination furnace to calcine the additives contained therein, so as to cool the hot reducing gas to a temperature level suitable for the shaft furnace;

supplying the cooled reducing gas to the shaft furnace to reduce the iron ore and to calcine the additives; and putting the reduced iron ore and the calcined additives of the shaft furnace into the melter gasifier, and making the reduced iron ore undergo a final reduction.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE INVENTION

Figure 1:
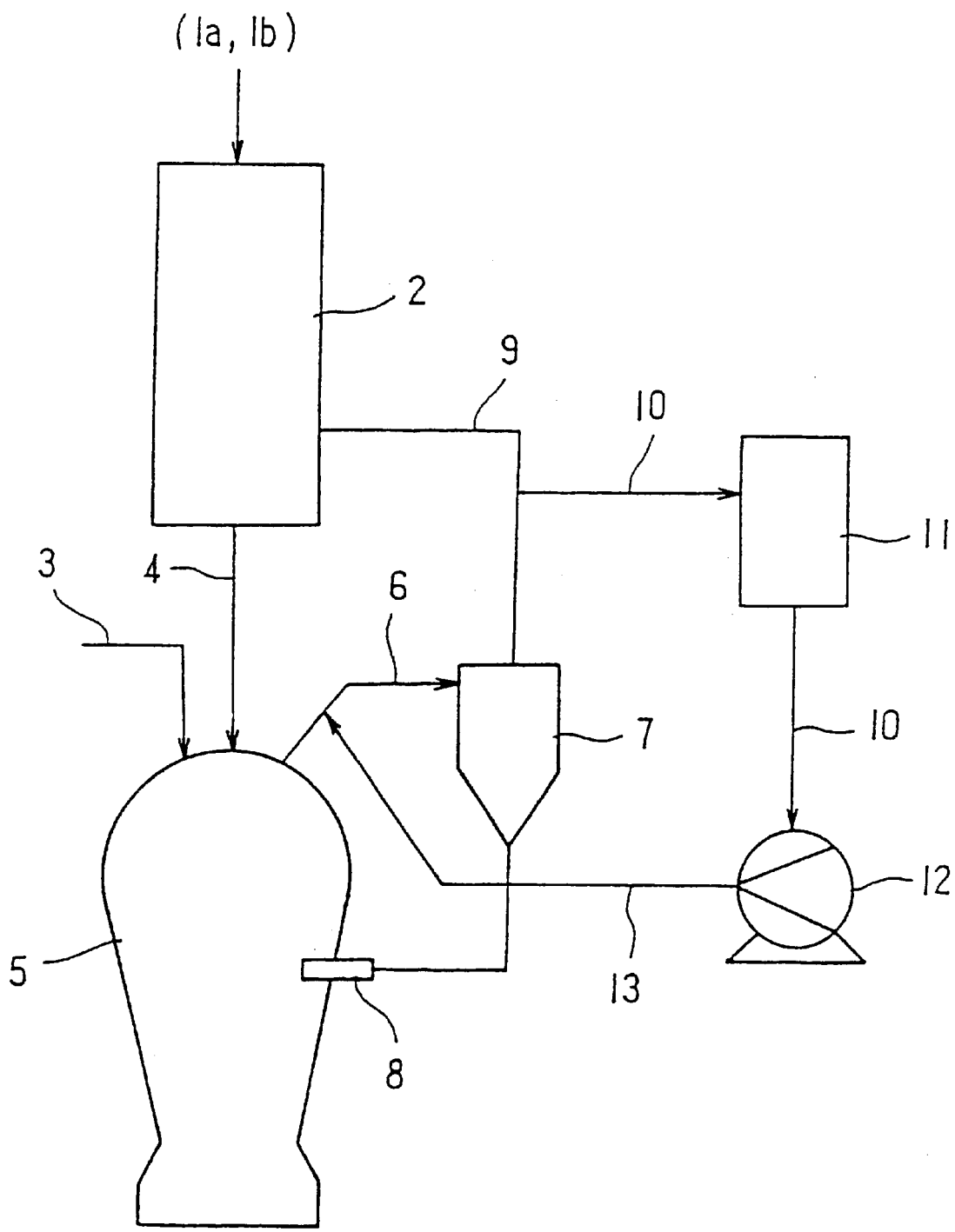
FIG. 1 is a schematic view showing the overall constitution of the conventional molten iron manufacturing apparatus using the ordinary coal.
Figure 2:
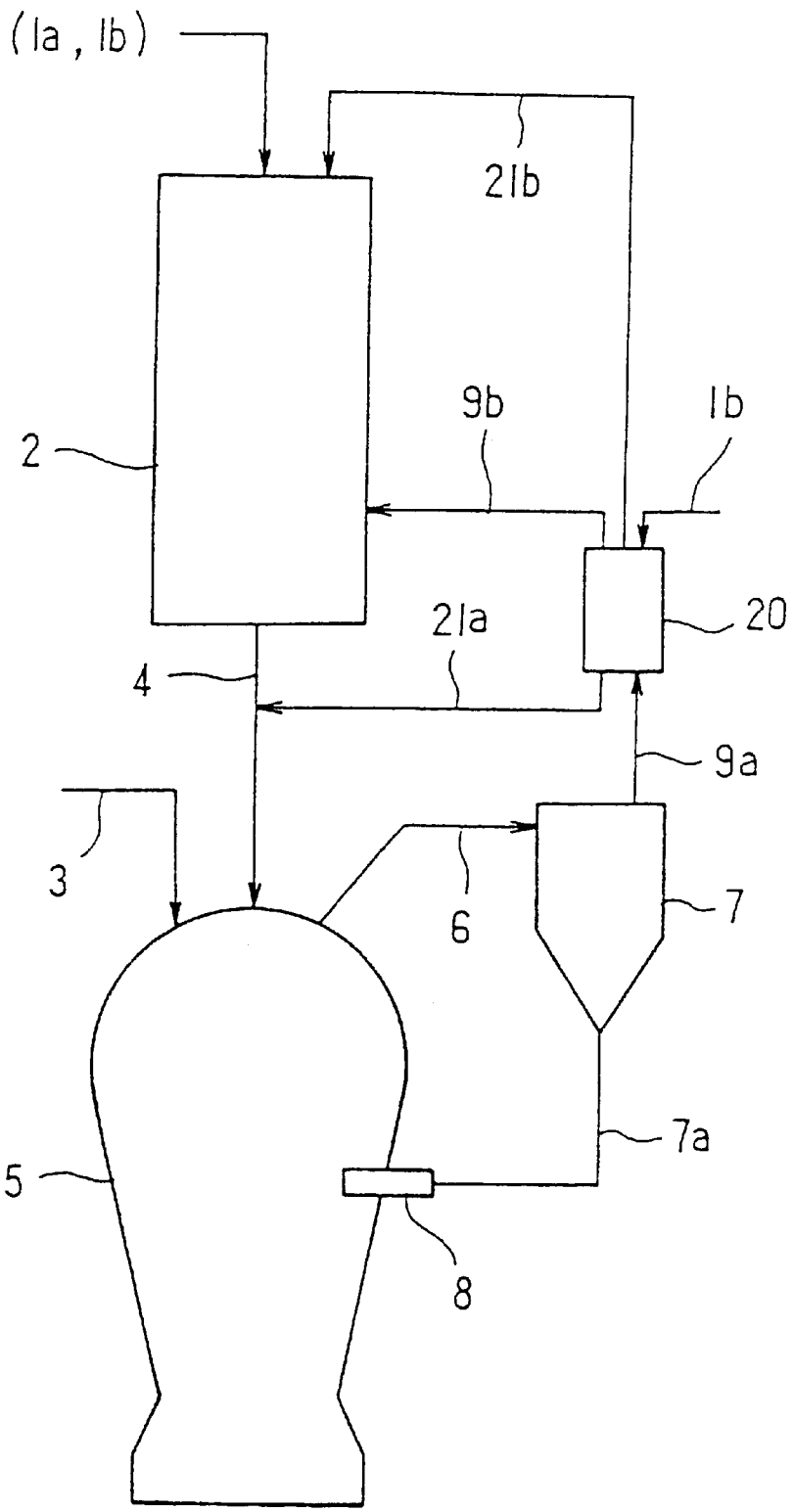
FIG. 2 is a schematic view showing the molten iron manufacturing apparatus using a calcination furnace according to the present invention.

As shown in FIG. 2, the molten iron manufacturing apparatus according to the present invention uses ordinary coal 3, and cools the reducing gas in a calcination furnace 20. A shaft furnace 2 receives an iron ore 1a and additives (lime stone and dolomite) 1b. A melter gasifier 5 receives an ordinary coal 3 for use as a burning means. The melter gasifier 5 also receives calcined additives and a reduced iron ore which is furnished from the shaft furnace 2. The calcination furnace 20 is disposed between a cyclone 7 and the shaft furnace 2, and this calcination furnace 20 receives a part (lime stone) of the additives 1b which are put into the shaft furnace 2.

In the calcination furnace 20, the additive (lime stone) is temperature-raised by a hot reducing gas of 1000–1100° C., and is calcined, so that a hot reducing gas of 1000–1100° C. can be adjusted to the optimum reducing temperature of 800–850° C. In the calcination furnace 20, amounts of heat are consumed as defined in the following formulas for temperature-raising the additives of the normal temperature to a temperature of 897° C. and for causing a calcination reaction of the lime stone. Amount of heat for temperature-raising $$Q = \int_{T1}^{T2}(82.34 + 4.975 \times 10^{-2}T - 12.87 \times 10^{5}T^{-2})dT$$

Calcination heat=$CaCO_3 \rightarrow CaO + CO_2$
$\Delta H$=760 Kcal/Kg.CaO (temperature: 897° C.)

Meanwhile, the shaft furnace 2 is connected through an ore feeding line 4 to the melter gasifier 5, while the melter gasifier 5 and the cyclone 7 are connected together by means of a generator gas line 6. The generator gas line 6 is for carrying the reducing gas which is produced in the melter gasifier 5. Further, between the melter gasifier 5 and the cyclone 7, there is connected a dust line 7a for feeding back the dusts which have been captured and separated by the cyclone 7. Further, a dust burner 8 is installed on a side of the melter gasifier 5 and is connected to the lower tip of the dust line 7a, so that the dusts can be introduced through the dust burner 8 into the melter gasifier 5.

Further, a reducing gas line 9a is connected between the cyclone 7 and the calcination furnace 20 so as to carry the hot reducing gas of 1000–1100° C., after the hot reducing gas has gotten rid of the dusts.

Further, a reducing gas line 9b is connected between the calcination furnace 20 and the shaft furnace 2, for supplying a cooled reducing gas of 800–850° C. Between the calcination furnace 20 and the shaft furnace 2, and between the calcination furnace 20 and the melter gasifier 5, there are connected additive feeding lines 21a and 21b respectively.

In order to carry the calcined additives from the calcination furnace 20, there are used the following methods. That is, a screw feeder is installed under the calcination furnace 2, so that the calcined additives can be directly supplied to the melter gasifier 5. Or a skipper (not shown in the drawings) is used to carry the calcined additives into the shaft furnace from above, and an additive feeding bin (not shown in the drawings) is used to feed the additives into the shaft furnace 2.

Figure 3:
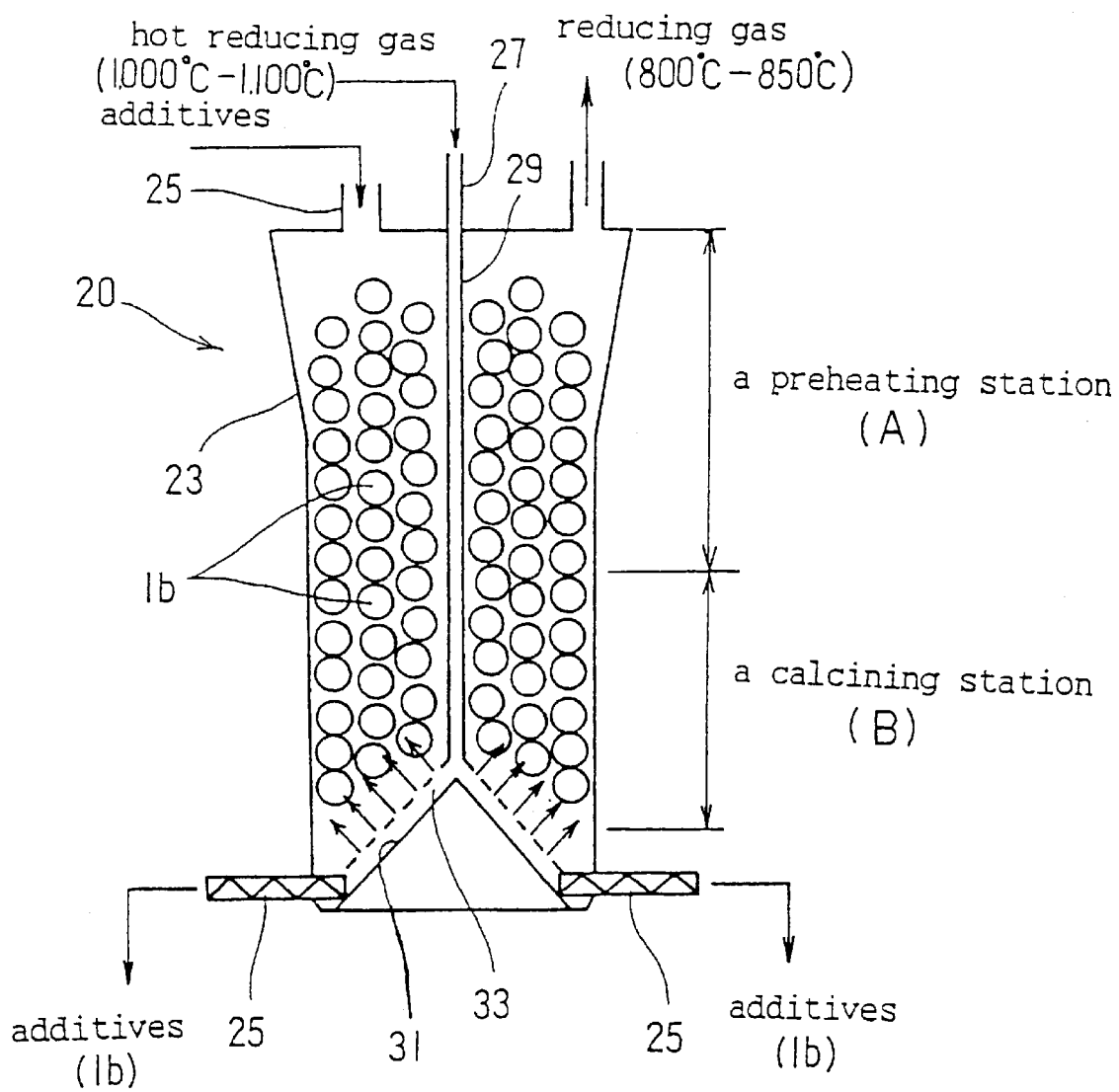
FIG. 3 illustrates the calcination furnace according to the present invention.

FIG. 3 is a schematic view showing the calcination furnace 20 which is provided on the molten iron manufacturing apparatus of the present invention.

As shown in FIG. 3, the calcination furnace 20 is constituted such that the upper portion of a hollow casing 23 forms a preheating station A, and its lower portion forms a calcining station B. The lime stone which is an additive 1b is fed from the upper portion of the casing 23 of the calcination furnace 20 into an additive inlet 25, so that the additive would slowly descend from the preheating station A toward the calcining station B. During the descent within the casing 23, the additive is temperature-raised and calcined. Then the calcined additive is discharged through a screw feeder 25 so that the additive would be directly fed into the melter gasifier 5, the melter gasifier 5 being connected directly below. Or through the skipper (not shown in the drawings), the additive is fed into the feeding bin (not shown in the drawings) so as to be supplied to the shaft furnace 2.

Meanwhile, the hot reducing gas having a temperature of 1000–1100° C. is carried through a reducing gas line 29 which is connected from a reducing gas inlet 27 of the top of the calcination furnace 20 to the bottom of the casing 23. Then the hot reducing gas is scattered back by a conical plate 31 which is installed on the bottom of the casing 23. Then the scattered hot reducing gas is supplied through a scattering plate 33 upward to the additive within the casing 23.

The conical plate 31 which is installed within the calcination furnace 20 controls the flow of the additive, so that the additive would flow smoothly downward. The scattering plate 33 which is mounted upon the conical plate 31 makes the hot reducing gas widely dispersed, so that the gas supply would become uniform.

Thus the hot reducing gas (1000–1100° C.) which is supplied into the calcination furnace 20 calcines the additive which is filled within the calcination furnace 20. At above 1000° C., the lime stone is speedily calcined. The hot reducing gas calcines the additive $1b$ of the calcining station B which is disposed in the lower portion of the casing 23. Then the reducing gas which has passed through the calcining station B heats the lime stone which is filled within the pre-heating station A of the upper portion of the calcination furnace 20. Then the reducing gas is discharged through an upper outlet so as to be supplied to the shaft furnace 2.

Figure 4:
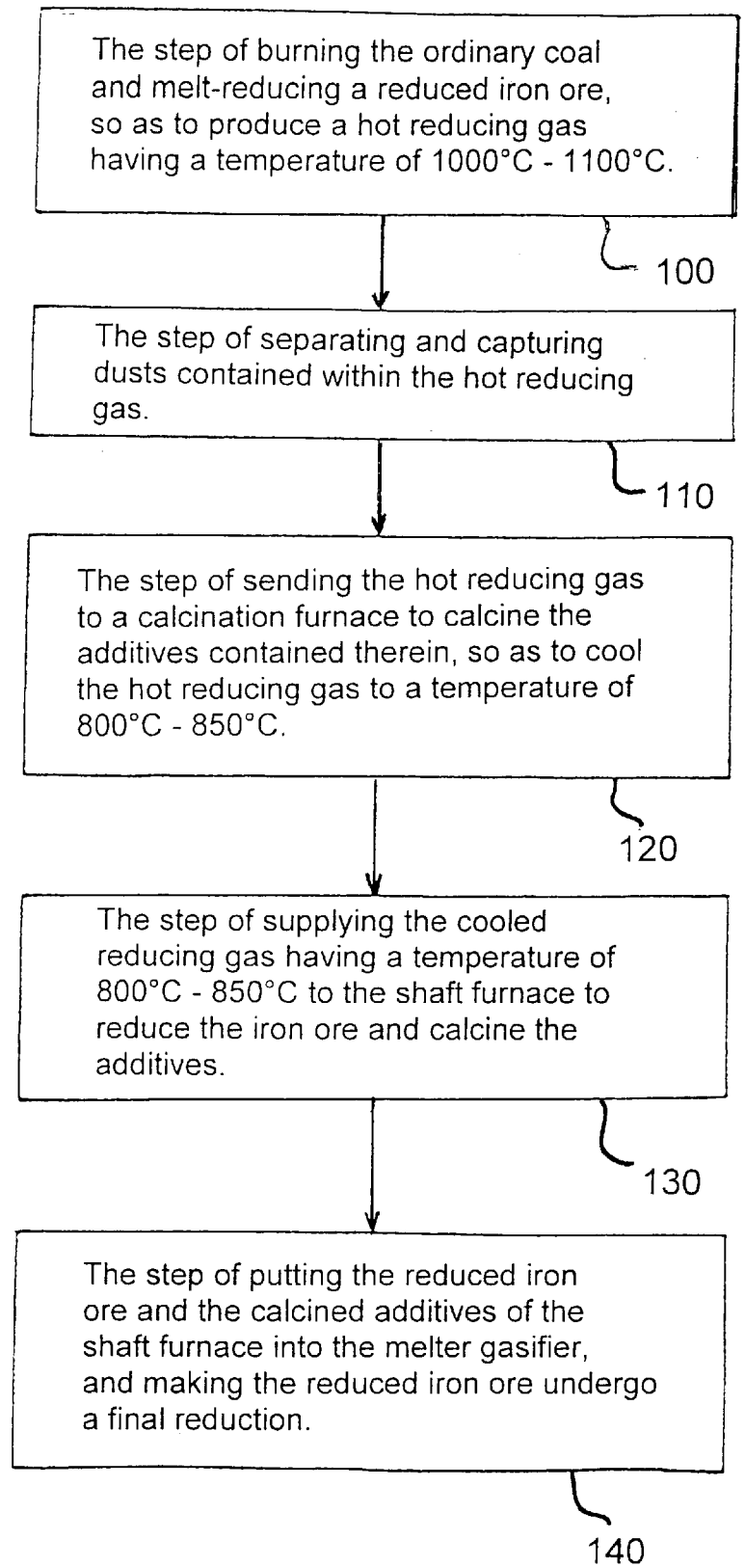
FIG. 4 is a flow chart showing the molten iron manufacturing method using the calcination furnace according to the present invention.
Figure 5:
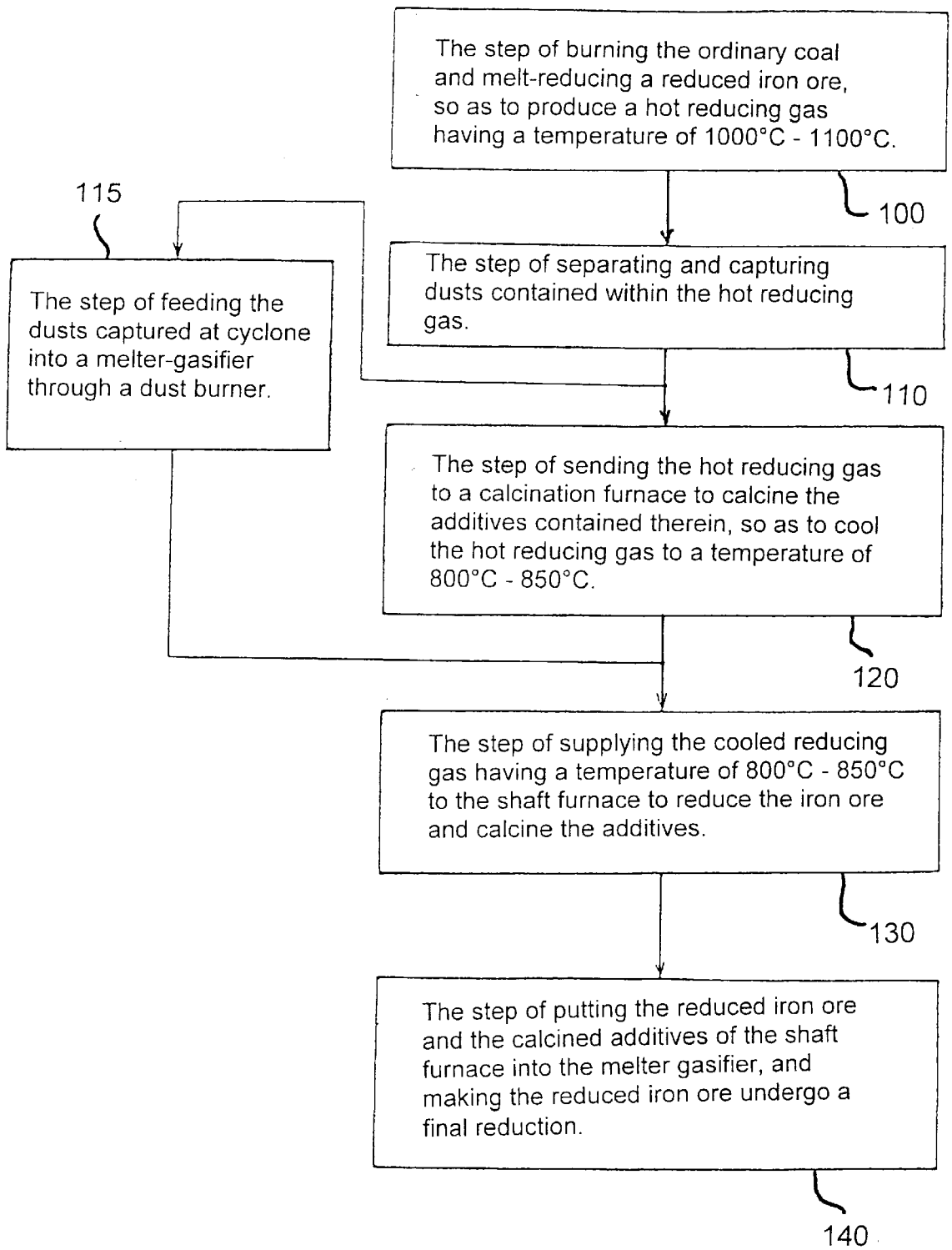
FIGS. 5A and 5B are flow charts showing other embodiments of the molten iron manufacturing method using the calcination furnace according to the present invention.
Figure 5:
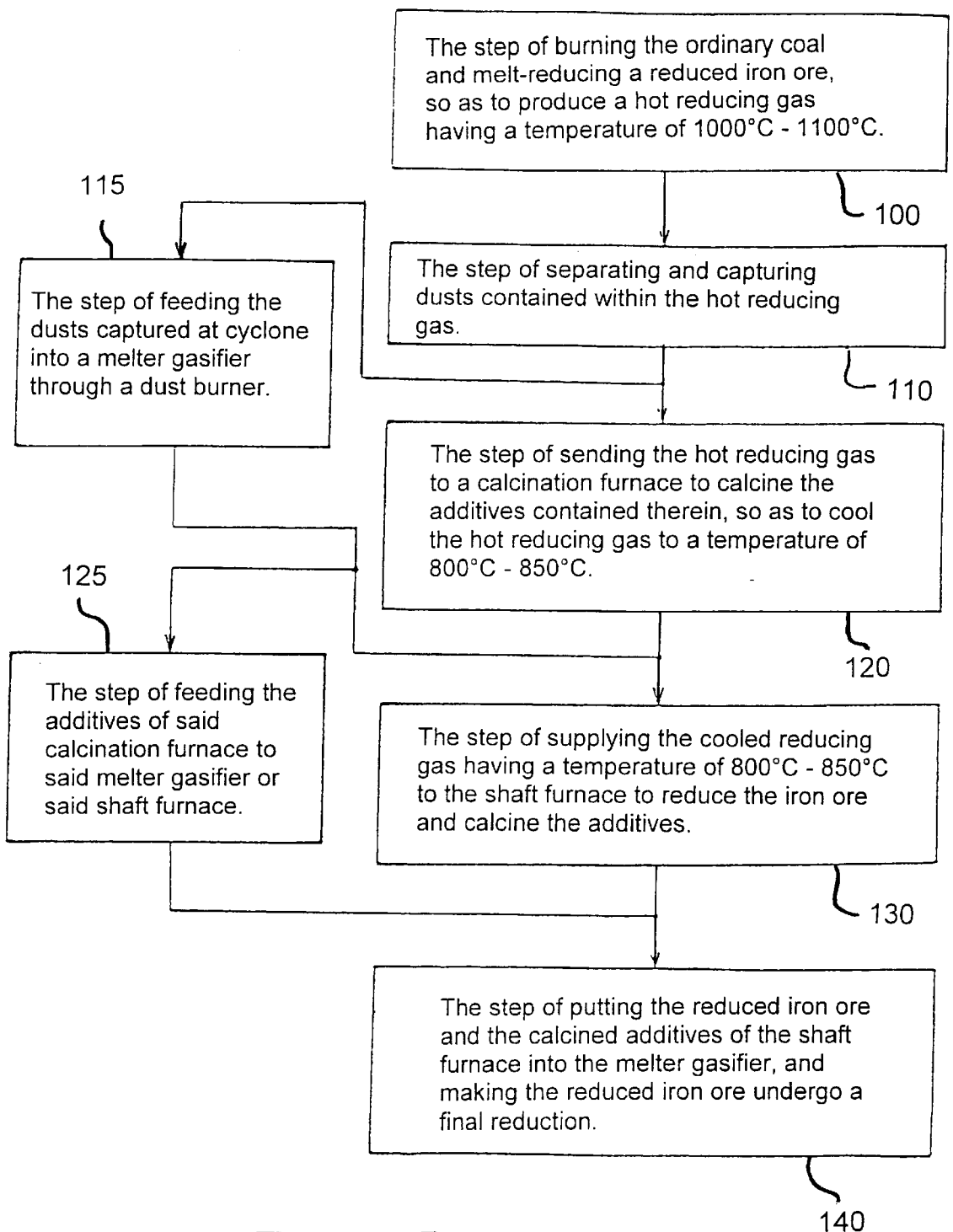

Now the respective embodiments of the method for manufacturing the molten iron according to the present invention will be described referring to FIGS. 4 and 5.

First, the ordinary coal 3, the reduced iron ore $1a$ and the additive $1b$ are fed into the melter gasifier 5. Then by burning the ordinary coal 3, the reduced iron ore $1a$ is finally reduced and smelted, and a hot reducing gas having a temperature of 1000–1100° C. is produced (step 100). That is, by burning the ordinary coal 3 within the melter gasifier 5, the iron ore is melted and reduced by utilizing the produced heat and the reducing gas.

Then a step 110 is carried out in which the hot reducing gas having a temperature of 1000–1100° C. is sent from the melter gasifier 5 to the cyclone 7 so as to separate and capture the dusts contained in the reducing gas. Owing to the centrifugal force of the cyclone 7, the dusts are separated from the hot reducing gas.

Then at a step 120, the hot reducing gas of 1000–1100° C. which has passed through the cyclone 7 is sent to the calcination furnace 20 containing the additive (lime stone), so that the additive within the casing 23 would be calcined, thereby lowering the temperature of the reducing gas to 800–850° C. Separately from the step 120 or simultaneously with it, the dusts which have been captured by the cyclone 7 are fed through the dust burner 8 into the melter gasifier 5 (step 115).

The calcination furnace 20 is connected through the reducing gas line $9a$ to the cyclone 7, and the additive (lime stone) $1b$ is filled into the casing 23 of the calcination furnace 20. The hot reducing gas (1000–1100° C.) which have gotten rid of the dusts at the cyclone 7 is supplied to the calcination furnace 20, so that the reducing gas can calcine the additive (lime stone). After going through the calcination procedure, the hot reducing gas is cooled down to 800–850° C.

Meanwhile, at a step 125, the additive which has been calcined by the hot reducing gas at the calcination furnace 20 is transferred to the melter gasifier 5 or to the shaft furnace 2 through the additive feeding line $21a$ or $21b$ by the help of the screw feeder or the skipper. Separately from this or simultaneously with it, the reducing gas (800–850° C.) which has been cooled to the optimum reducing temperature at the calcination furnace 20 flows through the reducing gas line $9b$ to the shaft furnace 2 so as to reduce the iron ore $1a$ within the shaft furnace 2 and to calcine the additive $1b$ (step 130).

Finally at a step 140, the iron ore $1a$ which has been reduced at the shaft furnace 2, and the additive $1b$ which has been calcined, are fed through an ore feeding line 4 into the melter gasifier 5. Thus the iron ore $1a$ which has been reduced at the shaft furnace 2 is finally reduced by the combustion heat of the ordinary coal 3.

Now the present invention will be described as to its action and effects.

During the manufacture of the molten iron using the ordinary coal 3, when the ordinary coal 3 is burned within the melter gasifier 5, the reducing gas is produced in an amount of 1,716 $Nm^3$ per ton of pig iron. Under this condition, the temperature of the reducing gas is 1000 to 1100° C., and the reducing gas is composed of 65–70% of CO, 3–5% of $CO_2$, and 25–30% of $H_2$. The amount of heat which is released in cooling the hot reducing gas to the optimum reducing temperature of 800–850° C., that is, the amount of heat for cooling the temperature of the hot reducing gas from 1000–1100° C. to 800–850° C., is 120,646,841 Kcal per ton or pig iron. This amount of heat is calculated in the following manner.

Heat amount for cooling the CO gas from 1050° C. to 850° C.:

$$Q=\int_{850}^{1050}(28.95+0.411\times10^{-2}T+0.3548\times10^{-5}T^{-2}-2.22\times10^{-9}T^3)dT=1688.909 \text{ cal/mol}° \text{ C.} \div 22.4\times1.716 \text{ Nm}^3\times1000\times0.65=81,608.88 \text{ Kcal}$$

Heat amount for cooling $CO_2$ from 1050° C. to 850° C.:
$Q=\int_{850}^{1050}(36.11+4.233\times10^{-2}T-2.887\times10^{-5}T^{-2}+7.464\times10^{-9}T^3)dT=2718.837$ cal/mol° C.$\div22.4\times1.716$ $Nm^3\times1000\times0.05=10,414.118$ Kcal Heat amount for cooling $H_2$ from 1050° C. to 850° C.:

$$Q=\int_{850}^{1050}(28.84+0.00765\times10^{-2}T+0.3288\times10^{-5}T^2-0.8698\times10^{-9}T^3)dT=1494.578 \text{ cal/mol}° \text{ C.}\div22.4\times1.716 \text{ Nm}^3\times1000\times0.25=28,623.843 \text{ Kcal}$$

Accordingly, the total heat amount for cooling the reducing gas from 1050° C. to 850° C. is 120,646.841 Kcal.

The amount of heat which is released during the cooling of the hot reducing gas from 1050° C. to 850° C. is utilized for calcining the additive (lime stone) $1b$ of the calcination furnace 20. At the same time, the hot reducing gas is cooled to the optimum reducing temperature, while the calcined additive is supplied through the additive feeding lines $21a$ and $21b$ to the shaft furnace 2 and the melter gasifier 5 respectively.

Meanwhile, the additive (lime stone) calcination capacity of the calcination furnace 20 is as follows. That is, the amounts of lime stone and dolomite which are fed into the shaft furnace 2 are 208 Kg of lime stone and 134 Kg of dolomite per ton of pig iron. The lime stone contains 49.55% of CaO and 3.66% of MgO. The decomposing reactions of $CaCO_3$ and $MgCO_3$ are endothermic reactions, and they absorb 760 Kcal/Kg-CaO and 700 Kcal/Kg-MgO respectively.

Therefore, if the lime stone which is to be fed into the shaft furnace 2 is put into the calcination furnace 20, the amount of heat required for the temperature rise can be calculated based on the following formula, and this is 50,131.7 Kcal/T-P.

Heat amount required for the temperature rise:

$$Q=\int_{298}^{1170}(82.34+4.975\times10^{-2}T-12.87\times10^5T^{-2})dT=24101.78 \text{ cal/mol}° \text{ C.}\div100\times1000=241.0178 \text{ Kcal/Kg.CaCO}_3\times208=50,131.7 \text{ Kcal/T-P}$$

The amount of heat required for the calcination is 78,328.64 Kcal/T-P per ton of pig iron.

Calcination heat: $CaCO_3 \rightarrow CaO+CO_2$ $\Delta H=760$ Kcal/Kg.CaO, Temperature 897° C.

$$Q=208\times0.4955\times760=78,328.64 \text{ Kcal/T-P}$$

Accordingly, the amount of heat which is required for temperature-raising and for calcining the lime stone is 128,460.3 Kcal per ton of pig iron, while 93.92% of lime stone to be fed into the shaft furnace 2, i.e., 195.3 Kg of lime stone can be filled into the calcination furnace 20.

As can be seen in the above descriptions, the hot reducing gas having a temperature of 1000–1100° C., which is produced in the melter gasifier 5, is made to pass through the calcination furnace 20 which is installed between the cyclone 7 and the reducing gas line 6, thereby using the heat of the hot reducing gas for calcining the lime stone. Thus 93.92% of the additive (lime stone) to be fed into the shaft furnace 2 is calcined by utilizing the superfluous heat of the hot reducing gas, with the result that the calcination degree of the lime stone can be improved. Therefore, the heat required for calcining the additive can be saved in the shaft furnace 2.

Further, a separate cooling device for cooling the hot reducing gas of the melter gasifier 5 is not required. Further, the hot reducing gas having a temperature of 1000–1100° C. is naturally cooled down to 800–850° C. at the calcination furnace 20, and therefore, the thermal efficiency of the hot reducing gas of the melter gasifier 5 is maximized. Further, a separate water-using cooler and a separate compressor are omitted, and therefore, the molten iron manufacturing facility is simplified.

What is claimed is:

1. An apparatus for manufacturing molten iron including a shaft furnace for receiving an iron ore and additives, and a melter gasifier for receiving a reduced iron ore, calcined additives and an ordinary coal, comprising:
    a calcination furnace for receiving a hot reducing gas through a reducing gas line from a cyclone, for receiving one of said additives, and for calcining said additive by means of the hot reducing gas to cool the hot reducing gas to an optimum reducing temperature suitable for said shaft furnace, said calcination furnace being connected through a reducing gas line to said shaft furnace; and
    a plurality of additive feeding lines connected between said calcination furnace, said shaft furnace and said melter gasifier, for supplying the calcined additive to said shaft furnace and to said melter gasifier, after the additive has been calcined by the hot reducing gas in said calcination furnace.

2. The apparatus as claimed in claim 1, wherein the hot reducing gas introduced into said calcination furnace has a temperature of 1000–1100° C.

3. The apparatus as claimed in claim 1, wherein the hot reducing gas supplied from said calcination furnace to said shaft furnace has an optimum reducing temperature of 800–850° C.

4. A method for manufacturing a molten iron by using a shaft furnace for receiving an iron ore and additives, and a melter gasifier for receiving a reduced iron ore, calcined additives and an ordinary coal, so as to reduce the iron ore to a molten iron, comprising the steps of:
    burning the ordinary coal within said melter gasifier, and melt-reducing a reduced iron ore, so as to produce a hot reducing gas;
    separating and capturing dusts contained within the hot reducing gas;
    sending the hot reducing gas to a calcination furnace to calcine one additive contained therein, so as to cool the hot reducing gas to a temperature level suitable for said shaft furnace;
    supplying the cooled reducing gas to said shaft furnace to reduce the iron ore and to calcine the additives; and
    putting the reduced iron ore and the calcined additives of said shaft furnace into said melter gasifier, and making the reduced iron ore undergo a final reduction.

5. The method as claimed in claim 4, wherein dusts are separated from the hot reducing gas owing to a centrifugal force of a cyclone.

6. The method as claimed in claim 4, wherein, the dusts captured at said cyclone are fed through a dust burner into said melter gasifier.

7. The method as claimed in claim 4, wherein, the additive calcined by the hot reducing gas at said calcination furnace is fed through an additive feeding line to said melter gasifier or to said shaft furnace by a help of a crew feeder or a skipper.

8. The method as claimed in claim 4, wherein the reduced iron ore is finally reduced and melted by a combustion heat of the ordinary coal.

9. The method as claimed in claim 4, wherein the hot reducing gas has a temperature of 1000–1100° C.

10. The method as claimed in claim 4, wherein said shaft furnace requires an optimum reducing gas temperature of 800–850° C.

11. The method as claimed in claim 8, wherein the hot reducing gas has a temperature of 1000–1100° C.

12. The method as claimed in claim 8, wherein said shaft furnace requires an optimum reducing gas temperature of 800–850° C.

* * * * *

UNITED STATES PATENT AND TRADEMARK OFFICE
CERTIFICATE OF CORRECTION

PATENT NO. : 6,224,650 B1
DATED : May 1, 2001
INVENTOR(S) : Sang Deok Lee et al.

Page 1 of 1

It is certified that error appears in the above-identified patent and that said Letters Patent is hereby corrected as shown below:

<u>Title page,</u>
Item [73], Assignee, add two additional assignees:
-- Research Institute of Industrial Science & Technology (KR); and
Voest-Alpine Industrieanlagenbau GmbH (AT) --

<u>Column 2,</u>
Line 14, after "melter gasifier" insert -- 5 --.

<u>Column 4,</u>
Line 1, delete "throughan" and insert -- through an --.

Signed and Sealed this

Nineteenth Day of February, 2002

Attest:

Attesting Officer

JAMES E. ROGAN
*Director of the United States Patent and Trademark Office*